United States Patent Office 3,159,528
Patented Dec. 1, 1964

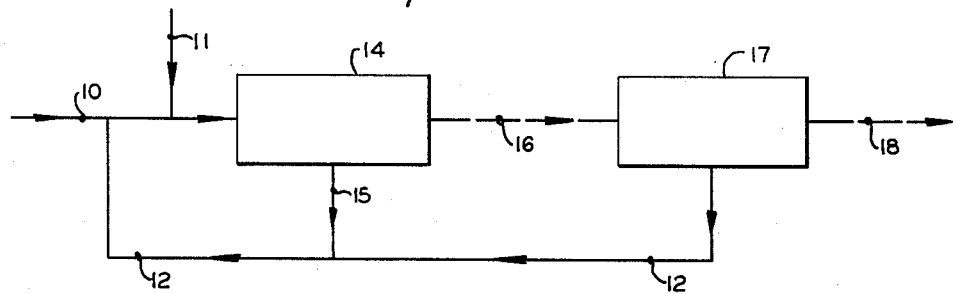
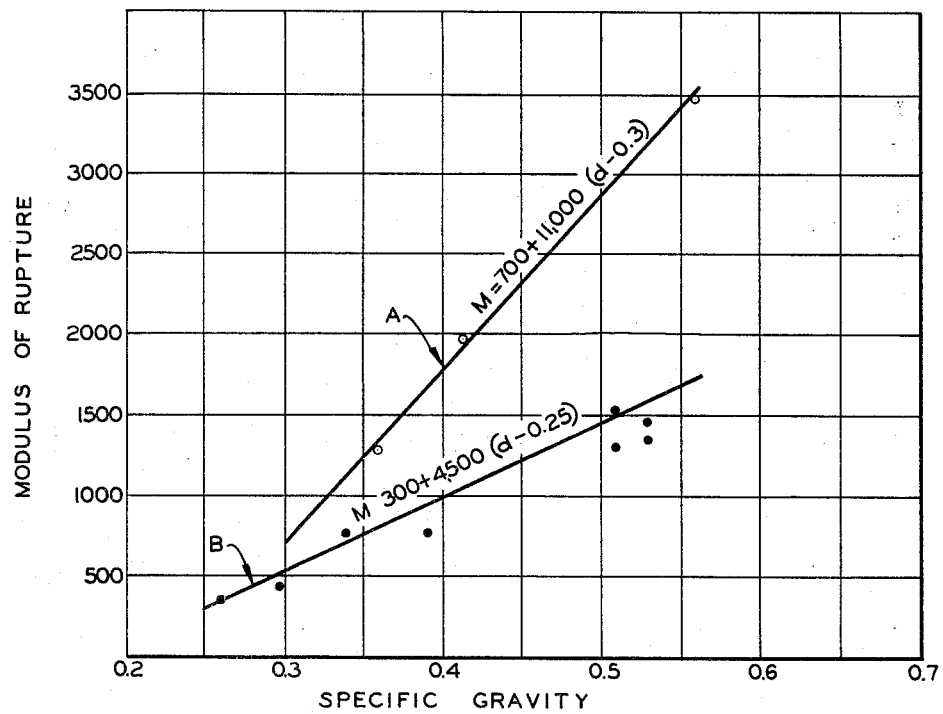

3,159,528
FIBERBOARD CONTAINING A THERMOSETTING RESIN DERIVED FROM WASTE SULPHITE LIQUOR AND PROCESS OF MAKING SAME
Worth C. Goss, Kirkland, Wash., assignor to The Sheetwood Products Company, San Francisco, Calif., a corporation of Washington
Filed May 13, 1957, Ser. No. 658,676
3 Claims. (Cl. 162—163)

This invention relates to the production of artificial or composition board. More particularly it relates to board prepared from wood or other vegetable fibers, such board having a high mechanical strength in relation to specific gravity and also having water and weather resistant characteristics equal to or approximating those of conventional tempered hardboard.

This application is a continuation-in-part of the following copending applications:

Serial No. 339,831, entitled "Process of Treatment and Products From Waste Liquors," filed March 2, 1953, now U.S. Patent No. 2,849,314, issued August 26, 1958, and Serial No. 643,519, entitled "Lignosulfonate Derivative," filed March 4, 1957 now U.S. Patent No. 3,079,353.

Generally speaking, tempered hardboards presently produced have specific gravities of about 0.90 to 1.40; they have moduli of rupture of about 3000 to 12,000 pounds per square inch; they have high resistance to water absorption; and they have good weathering characteristics adapting them for exterior use. Generally such boards are produced from wood fibers prepared by either of two processes. The first process of fiber preparation—the socalled "Masonite process"—subjects wood chips to the action of steam at high temperature and pressure, followed by sudden release of the pressure to explode the chips and yield a mass of fibers. The second process of fiber preparation subjects wood chips to the softening action of steam, then to mechanical attrition to reduce the softened chips to a mass of fibers. In both processes the fibers produced are quite coarse compared to the fibers of wood pulp of the type employed to form paper and soft board. These coarse fibers are consolidated by heat and pressure, aided in some cases by the addition of a thermosetting resin such as a phenolformaldheyde resin. It is believed that the natural binding agent of wood, namely, lignin, acts as the principal binding agent in the production of hardboard. Hardboard is, therefore, truly a reconstituted board.

Soft board, also known as insulation board, is generally produced from wood pulp prepared by chemical digestion and/or steam softening followed by mechanical attrition. The fibers are sufficiently fine and hydrated to form into a mat or pad by a felting operation similar to that employed in conventional paper making. Soft board is highly porous, it has a low specific gravity and it has very little mechanical strength. Also it has very poor water resistance.

There exists a need for a board which combines certain advantages of soft board with certain advantages of hardboard. Thus, soft board has a desirable low specific gravity, but it is unsuitable for exterior use because of its poor weathering properties, and lack of resistance to water. It is also unsuitable for any structural use where a substantial load is placed upon the board.

Tempered hardboard has desirable weathering qualities and mechanical strength, but it also has a very high specific gravity, which makes the board costly to ship and difficult to handle. Also the manufacture of high strength hardboard requires compression of the coarse fibers at a high temperature and a high pressure. The high temperature, high pressure requirement necessitates heavy and expensive presses. Further disadvantages of present-day hardboard are its difficult workability and nailing properties. Thus, nails do not hold well in many hardboards; sawing leaves ragged edges; and shaping with cutting tools is difficult.

For purposes of comparison and evaluation there has been devised a measure of mechanical strength which takes specific gravity into account. The moduli of rupture of several boards of the present invention have been determined and plotted against specific gravity, and the equation of the resulting linear curve has been determined. A similar equation has been determined for conventional boards commercially available today, including tempered hardboards. The two equations are as follows:

(1) Equation for boards of the invention:

$$M = 700 + 11,000(d - 0.3)$$

(2) Equation for other, commercially available boards of comparable density:

$$M = 300 + 4500(d - 0.25)$$

In these equations, M is the modulus of rupture in pounds per square inch as determined by the procedure of ASTM D1037–52T and $d$ is the specific gravity of the board in pounds per cubic inch. The modulus M is determined for dry, unaged board.

It is an object of the present invention to provide improved fiber board material having greater mechanical strength and greater weather and water resistance in relation to specific gravity than boards heretofor commercially available.

It is a further object to provide a fiber board having a mechanical strength and weathering characteristics comparable to those of present-day tempered hardboard but having a much lower specific gravity.

A further object of the invention is to provide a fiber board having a modulus of rupture expressed by Equation 1 above.

Another object of the invention is to provide a method of preparing improved fiber board material.

Another object is to provide artificial boards reconstituted from wood fibers which are characterized by low density (less than that of the original wood), high mechanical strength in relation to density, high dimensional stability, high wet strength, good workability with cutting and shaping tools and good nailing properties.

A further object is to provide a method whereby vegetable fibers can be consolidated into a board material having good weathering properties and water resistant properties and high mechanical strength without the need for employing high pressures and without forming a board of high density.

Yet another object is to provide an artificial board material reconstituted from vegetable fibers by a felting process, such board having a density less than the woody material from which the fibers are prepared but having, nevertheless, a high mechanical strength.

These and other objects of the invention will be apparent from the ensuing description and the appended claims.

I have found that structural boards having must greater mechanical strength and weather resistance than soft boards and considerably lower specific gravities than conventional exterior tempered hardboard, can be formed by forming a wet pad from fine fibers by a wet felting operation, and by avoiding high pressures but using, instead, a chemical bonding agent.

In accordance with the present invention I provide, as the starting material, a fiber having a fineness more closely approximating the fineness of fibers in pulp employed to produce paper, rather than the relatively coarse fibers employed to produce conventional hardboard. In fact, paper pulp prepared by chemical refining of wood chips to remove all or a substantial part of the lignin and to leave mainly or entirely the cellulose component of the wood, and beaten to a fineness and degree of hydration suitable for paper making, may be employed as the starting material. However, I prefer to employ a somewhat coarser, freer pulp, e.g., a pulp having a freeness (Canadian Standard) of 600 or more. Since the principal object of the invention is to prepare a structural board, a much thicker pad must be formed on the felting machine than is formed in paper manufacture. Thick pads drain slowly; hence, to maintain suitable production rates, a freer fiber is preferred.

Preferably a fiber of this character is produced which retains most of its lignin and which is prepared by cold digestion with a chemical liquor followed by a mechanical pulping as described hereinafter. Although, as stated, the fibers employed in the present invention need not be and preferably are not as highly refined as paper pulp, nevertheless the fibers should be in a state of fineness such that they are able to felt and form a mat or pad on a wet felting machine, such pad, when dried, being form-sustaining and at least as strong as soft board.

To supply a strong bond between the fibers, I incorporate a thermosetting resin of a type which is capable of bonding with the fibers. Preferably I employ for this purpose a thermosetting resin derived from waste sulfite liquor. One such resin is described and claimed in my copending application Serial No. 339,831, entitled "Process of Treatment and Products From Waste Liquors," filed March 2, 1953. The preferred resin is described in the aforesaid copending application Serial No. 643,519, entitled "Lignosulfonate Derivative," filed March 4, 1957. Other suitable resins are Meadol (a lignin product produced by The Mead Corporation), phenolic resins (e.g., phenol-formaldehyde) and urea (e.g., urea-formaldehyde) resins. Such substitue resins, however, do not provide as high strength and water resistance as the preferred waste sulfite liquor resins.

The resin may be incorporated in the fibers by any of several methods. Thus, a wet pad may be formed from the fibers and an aqueous solution of the resin may be sucked through the pad, thereby saturating the pad with resin solution. The pad is then dried by evaporation to cause deposition of the resin on the fibers.

Another method of incorporating the resin in the fibers consists of adding the resin in soluble form to the pulp before the pulp is felted, followed by precipitation of the added resin (preferably in conjunction with conventional papermarkers' rosin) by adding a conventional precipitant such as alum.

Preferably, however, a closed circuit method is employed in which a body of "white water" is circulated. Pulp is added to the circulating white water to yield the desired concentration of fiber, e.g. 0.5 to 1.25%, preferably about 1%. The resin is also added in quantity sufficient to maintain the desired concentration in the circulating water, e.g., 3 to 7%. A pad of desired thickness is formed continuously on a felting machine. White water is drained from the pad and is recycled.

A pad is thus formed in a continuous manner and is cut into suitable lengths and subjected to pressure, e.g., 100 lbs. per square inch, to reduce the water content to, say, 100% of the weight of the fiber. Water squeezed out of the pad is recycled to the system and the squeezed pad is then dried by thermal means to evaporate the water. It will be apparent that, if the pad after pressing but before evaporating any water, contains 100% of water (based on fiber weight), then the dry pad will contain the same percentage of resin as the circulating white water.

A closed system of this character is preferred for several reasons. As distinguished from sucking a resin solution through a pad, the closed circuit method has the advantage that it can be carried out in a continuous manner. The advantage of a closed circuit method over precipitating resin on the fibers with alum is that it eliminates the cost of adding alum and a better end product results. For example, the board produced is more stable dimensionally.

The dried board is then baked, preferably at about 290° to 330° F. for a time sufficient to set and cure the resin, e.g., ½ hour to 1½ hours.

The board thus produced may be trimmed to size, sanded, sawed and otherwise finished to provide a novel and very useful structural board. However, it is preferred to "temper" the board. The tempering may be carried out by various known means, but preferably it is carried out in a novel manner as follows:

The board is treated with an acetone solution of phenol-fomaldehyde resin. Instead of phenol-formaldehyde resin, other resins such as diallyl phthalate or other thermosetting resins or thermoplastic resins may be used, which are soluble in volatile organic solvents and have suitable hardness characteristics. Instead of acetone other highly volatile organic solvents such as methanol may be used. The resin solution is preferably employed in quantity sufficient to incorporate about 3 to 7% of the phenol-formaldehyde resin in the board.

Preferably beta naphthol is also dissolved in the acetone solution of phenol-formaldehyde resin. The beta naphthol improves the water repellency and mold resistance of the board.

The solvent is evaporated and the board is then subjected to heat and pressure, preferably about 310° F. at a pressure of 5 to 10 lbs. per square inch. The press employed is preferably provided with steel gauge elements between the platens to prevent compressing the board to a thickness less than that of the gauge elements.

The preferred tempering step thus described compresses the board to its final thickness; it gives the surfaces a high gloss; it improves paintability; it prevents warping; it improves dimensional stability; and it improves the modulus of rupture.

The following specific examples will serve further to illustrate various steps in board preparation in accordance with the invention.

EXAMPLE 1.—FIBER PREPARATION

Wood chips, e.g., Western red cedar chips, are subjected to steaming at atmospheric pressure, then to a high vacuum, e.g., a vacuum of about 29.5 inches of mercury. The purpose of this treatment (which may be repeated, if necessary) is to displace substantially all of the air in the chips. The vacuum is then broken with a chemical liquor consisting of 1% total solids, ⅔ of which is sodium hydroxide and ⅓ is sodium sulfide. The chips are flooded with this liquor, excess liquor is drained away, and the chips are allowed to stand and digest at room temperature for about 12 hours. After this cold digestion, if a relatively dense board, is to be produced, e.g., specific gravity about 0.55, the chips will then be autoclaved with 50 p.s.i. steam for about 10 minutes. If a lower density board is to be produced e.g., specific gravity 0.35, this steaming treatment is omitted. The chips are then squeezed at a suitable pressure, e.g., 200 to 1000 p.s.i. to remove black liquor, (i.e., spent pulping liquor), and the chips are then treated with boiling water for 10 minutes at atmospheric pressure and are squeezed again. They are then subjected to attrition in a "Bauer" refiner, followed by beating in conventional beating equipment to reduce the chips to a pulp having a freeness of about 700 Canadian Standard. This is rather freer than most pulps used for paper manufacture.

EXAMPLE 2.—RESIN PEPARATION

Dehydrated waste sulfite liquor, for example, the product known as "Orzan," which is a trademark of Crown-Zellerbach Company of San Francisco, California, is employed as a starting material. It is mixed in an insulated vessel with liquid anhydrous ammonia in the proportion of 500–700 lbs. of ammonia per 100 lbs. of dehydrated liquor. The mixture is stirred. Contact between the liquid ammonia and dehydrated liquor is maintained for a sufficient time to extract substantially all soluble material, which consists chiefly of sugars. Preferably the time of contact is sufficient to incorporate in the residue a substantial amount of fixed nitrogen. Thus, I have found that by maintaining contact for 16 hours as much as 1.89% fixed nitrogen is incorporated in the residue. Preferably I employ one hour of contact at atmospheric pressure, the temperature being −28° F. A residue containing about 1.2% fixed nitrogen results. This residue, which is referred to hereinafter as "amino lignosulfonate," has the following typical properties: When thoroughly washed with a solution of HCl in acetone, then with pure acetone to remove residual HCl and dissolved in water to a 5% concentration, it has a pH of 2.1. Its aluminum salt can be precipitated from an aqueous solution of the ammonium salt by adding aluminum sulfate to give a pH of 4.0. The precipitate is flocked. It is a very light brown, about the same shade as unbleached kraft paper. Water solubility decreases with time of contact of the liquid ammonia and increasing nitrogen content. Thus, a product obtained by 4 hours' contact contained 1.19% fixed nitrogen and was soluble in water to the extent of 30–40% in water, while a product obtained by 16 hours contact contained 1.89% fixed nitrogen and was soluble in water to the extent of 10 to 14%.

Amino lignosulfonate thus produced is dissolved in water to a concentration of from 1 to 40% by weight, preferably about 5 to 7%. Acetone and formaldehyde are then added. Acetone is added in the amount of about 3–50% by weight, preferably about 10% by weight, and formaldehyde (in the form of a 37% aqueous solution) is added in the amount of about 5–30%, preferably about 15% calculated as anhydrous formaldehyde. The percentages of formaldehyde and acetone are based on the weight of amino lignosulfonate. The solution is then refluxed at atmospheric pressure for 60 to 200 minutes, preferably about 180 minutes.

This procedure yields an aqueous solution of a material which I refer to as "amino lignosulfonate resin" and which is the preferred resin bonding agent of the present invention. The resin may be isolated but this is unnecessary for purposes of the present invention. Other details and varients of manufacture of this resin may be found in the aforesaid application Serial No. 643,519, entitled "Lignosulfonate Derivative," filed March 4, 1957.

EXAMPLE 3.—BOARD PREPARATION

Referring now to FIGURE 1 of the drawings, a system is there shown diagrammatically which employs a closed circuit. A pulp is prepared as in Example 1 and it enters the system through a line 10. Amino lignosulfonate resin is prepared as described in Example 2 and it enters the system through a line 11. Recycled white water passes through the line 12 in the direction shown, joining the fresh pulp and fresh amino lignosulfonate resin. The proportions of fresh pulp, fresh resin and recycled white water introduced through the lines 10, 11 and 12, respectively, are controlled to maintain the desired pulp consistency (e.g., 1% of fibers) and resin concentration (e.g., 3 to 7%). The pulp enters a felting machine, which is shown diagrammatically at 14 and which may be of any suitable type, for example, a cylinder machine, White water from the machine 14 passes through a line 15 to the recycle line 12. Felted product containing, for example, 25 to 40% of fibers is taken from the machine continuously at 16 and is cut into suitable lengths for squeezing and dewatering in a press, which is shown diagrammatically at 17. It is the purpose of the press 17, which is described in more detail hereinafter, to reduce the water content of the pad to say, 100% of the fiber weight. White water squeezed from the pad by the press 17 is recycled through the line 12. Wet pads from the press 17 are removed at 18 for further processing as described hereinafter.

The press shown diagrammatically at 17 is preferably a flat-bed diaphragm press having a fixed, solid lower platen and an upper, movable, perforated platen which is actuated by air pressure and is provided with means to suck or blow away water squeezed from the pad. Pressures of about 50 to 200 p.s.i. are adequate for the purpose. The pressure employed at this stage is an important feature in determining the specific gravity of the final product. Thus high pressures result in dense boards. A flat bed press of this or other suitable type is preferred to a roll type press. The latter press (roll type) exerts a high pressure along a line and tends to deform the fiber pad. The former press (flat bed) applies pressure uniformly over the entire area of a pad, hence does not tend to damage the fiber pad. A moderate pressure is sufficient with a flat-bed type or press to dewater the pad to the extent desired.

Pads from the press 17 are then conveyed through a drying oven in which they are heated by any suitable means, such as steam coils or combustion gases, to evaporate the water in the pads and to take the pads to complete dryness. A dry board is produced which is then baked at 290° to 330° F., preferably 315° F., for 30 to 90 minutes, preferably 60 minutes, to set and cure the resin. The baked, cured board is then subjected to a tempering treatment as follows, to improve water repellency and mold resistance:

The tempering solution is preferably a phenol-formaldehyde resin prepared as follows: About 90 parts by weight of phenol and 45 parts by weight of formaldehyde, together with 5% based on the weight of the complete mixture of 25% aqueous ammonia, are mixed together and are heated at about 95 to 100° C. in a resin kettle until the liquid is cloudy and a slight increase in viscosity is noted. The mixture is then cooled and permitted to stand, excess water is poured off and the residue of resin is dissolved in acetone. A 1 to 9%, preferably 3 to 7% solution in acetone is used as a tempering solution, to which 12% of beta naphthol is added. The percentage of beta naphthol is based on the weight of phenol-formaldehyde resin.

The baked, cured board is subjected to vacuum to eliminate as much air as possible and the vacuum is broken by admitting the tempering solution described above. The board takes up the tempering solution readily, and enough is employed to incorporate about 1 to 10%, preferably about 3 to 6%, of phenol-formaldehyde resin. Vacuum is then applied and the board is also heated to evaporate the solvent. The board is then placed in a platen press and is held in the press at 300° F. for 1 to 10 minutes and is subjected to a sufficient platen pressure to produce a glossy surface. Preferably the pressure treatment at this stage is accomplished in a platen type of press in which steel spacer elements or gauges are placed on the lower platen to limit downward movement of the upper platen. The platens are heated to the degree stated and, by reason of the steel gauge elements, they cannot compress the board to a thickness less than that of the gauge elements.

This operation produces a finished board having a glossy surface.

EXAMPLE 4.—MODIFIED PULPING METHOD

Instead of the preferred pulping method described in Example 1, a pulp suitable for board manufacture in accordance with the present invention may be prepared as follows:

Western red cedar chips are impregnated under pressure with a 1% aqueous ammonia solution and are then allowed to stand in a heap for a time sufficient to soften the chips, preferably for about 5 days. The chips are then boiled and ground to very fine fibers in an atmosphere of steam at atmospheric pressure. The grinding is carried to a point such that the fibers are so fine that they have very little freeness; i.e., when a pulp is prepared containing 2% of these fibers and 98% water and is laid down on a screen in quantity sufficient to produce a ½" board, the fibers would require an hour, more or less, to drain to a suitable degree for drying and board production.

The fine fibers thus produced are next treated with about 1% of formic or acetic acid and 4% of formaldehyde based upon the weight of the fibers. This step insolubilizes the phlobaphenes and tannins. The treated fibers are then made into a pulp with water and applied as a thin stream to a rotating screen of suitable mesh. At this stage, colloidal materials which produce extreme "slowness" (i.e., slowness to drain water) pass through the screen and the desired fibers remain on the screen, from which they are scraped. Repeated washing in this manner may be carried out. By this washing procedure, the freeness of the fibers is increased to a point where a ½" board can be laid down in two minutes drainage time.

EXAMPLE 5—MODIFIED RESIN PREPARATION

Instead of preparing a resin as described in Example 2 hereinabove, a resin suitable for board manufacture in accordance with the invention may be prepared as follows:

Calcium base waste sulfite liquor is employed as the starting material containing 8% solids. It is placed in a glass lined autoclave and mixed with 93% sulfuric acid in the amount of 4 liters of acid per 100 gallons of waste liquor. The autoclave is closed and the pressure is raised to about 115 p.s.i. by introduction of steam, the temperature in the autoclave being about 345° F. Sulfur dioxide is then allowed to escape while the pressure and temperature are maintained. A loosely fitted scraper is operated slowly in the liquor to keep the walls free of calcium sulfate precipitate, which forms during the autoclaving. This treatment is continued for about 50 minutes.

The autoclave is then opened and the contents are discharged and cooled. Lime is then added to raise the pH to between 2 and 5. Calcium sulfate precipitated during the autoclaving and by reason of the cooling and by reason of the added lime is separated by filtration and the filtrate is charged to a stainless steel lined autoclave. Ammonia gas is introduced to give a pH of about 11. Steam is introduced to raise the temperature to about 310° F. This temperature is maintained for 75 minutes, during which time air is bubbled through the liquid at a rate of 20 cubic feet per minute per 100 pounds of liquid. The autoclave is opened and sulfur dioxide, carbon dioxide or oxalic acid is added to precipitate all calcium in solution, which is separated by centrifuging.

The liquor is then dried by evaporation on a drum drier. The dry residue is then washed with mineral acid of pH 3 or less. The desired resinous product is insoluble and sinks to the bottom while soluble inorganic salts and sugars dissolve and can be separated by decantation. This procedure is repeated with plain water until the pH of the wash water is about 4.

The product, when dried, is a black solid, which is soluble in aqueous ammonia and sodium hydroxide, insoluble in petroleum solvents, ether, benzene, esters and alcohols. It is slightly soluble in glacial acetic acid, strongly soluble in formic acid and formamide. The pure resin and its calcium salt are insoluble in water whereas the sodium and ammonium salts are soluble in water. The salts, like the pure resin, are black solids. The salts decompose before melting and are amorphous. Density of the resin and its salts varies from 1.35 to 1.5. The ammonium salt softens on heating but decomposes before melting, and it is plasticized somewhat by 1–8% moisture, also by small amounts of formic acid or phenol. The sodium salt retains its solubility after heating (provided the heating is short of decomposition) while the ammonium salt tends to become insoluble. If the calcium salt is not too highly insoluble, it can be converted to the sodium salt by double decomposition with sodium oxalate.

A resin prepared as described above in the form of its ammonium salt is dissolved in water to yield a 10% aqueous solution and is applied to a blank or pad by sucking it through the pad, which is then subjected to pressure to squeeze out water to, say, 100% of the weight of dry fibers and is then subjected to thermal drying and further treatment (baking and tempering) as described in Example 3.

The black resin of Example 5 yields a structural board having a high mechanical strength, good weathering properties, a low specific gravity compared to conventional tempered hardboard, and good working and nailing properties. However, the light colored resin of Example 2 is preferred because, inter alia, it yields a board having a desirably light color.

As stated hereinabove the board products of the invention are characterized by high mechanical strength in relation to specific gravity. This combination of desirable features is illustrated by the graph of FIGURE 2 in which abscissae represent specific gravity and ordinates represent modulus of rupture as determined by the procedure of ASTM D1037–52T. The upper linear curve A is drawn through points plotted for three board products of the invention and the lower linear curve B is drawn through points plotted for several conventional pulp boards and insulation boards.

It will be seen that the boards of the invention have much greater moduli of rupture than other boards of similar specific gravity. Tempered hardboards are available having equal or greater moduli but they have specific gravities of about 1.0 or greater.

Another comparative criterion has been devised which reflects both specific gravity and mechanical strength. This is a "coefficient of structural merit" (CSM) which is determined as follows: A beam is selected which is 24" long by 6.43" wide and which weighs one pound. (The 6.43" width is selected because one of the boards of curve A in FIGURE 1 having a specific gravity of 0.35 has the dimensions 24" x 6.43" x ½" per pound.) From the modulus of rupture, a breaking load is calculated. Table I compares the breaking loads or coefficient of structural merit of the boards of curve A with conventional boards.

*Table I*

|  | Breaking Load (Coefficient of Structural Merit) | |
| --- | --- | --- |
|  | Before Artificial Aging | After Artificial Aging |
| (1) Boards of invention: |  |  |
| (a) 0.35 sp. gr. board | 58 | 49 |
| (b) 0.41 sp. gr. board | 68 | 60 |
| (c) 0.55 sp. gr. board | 66 | 56 |
| (2) Tempered wood fiber boards | 43–45 | 25–28 |
| (3) Wood particle boards | 19–20 | 6–10 |
| (4) Untempered wood fiber boards | 24–34 | 10–18 |
| (5) Pulp boards | 28–34 |  |
| (6) Insulating fiber boards | 29–39 |  |

The artificial aging test was conducted as follows:

(1) The specimen is immersed in water at 120°±3° F. for one hour; (2) than sprayed with water vapor at 200°±5° F. for three hours; (3) then stored at 10°±5° F. for twenty hours; (4) then heated at 210° F.±3° F. in dry air for three hours; (5) then step (2) is repeated; (6) then heated at 210° F.±3° F. in dry air for eighteen hours. The cycle is repeated five times, making a total of six cycles. Certain of the comparative boards were not subjected to this rigorous aging test because it was known that the boards would disintegrate.

It will be apparent from Table I that the boards of the invention are outstanding in regard to their breaking loads.

In addition to a high mechanical strength and weather and water resistance, the board material of the invention also has other highly desirable properties. Thus, it can be sawed, cut and shaped readily; it can be nailed readily; and nail holding power is high. In these respects the board material of the invention is comparable to lumber and is greatly superior to present day conventional hardboard, which is difficult to saw, shape and nail and which has a poor nail holding quality.

The board material of the invention also has a high dimensional stability and high wet strength. Thus, a board subjected to an atmosphere of 50% humidity, then to an atmosphere of 97% humidity undergoes only about a 0.2 to 0.3% linear expansion, which is much lower than other composition boards of the same density range. Also, upon soaking 24 hours in water the board material of the invention absorbs only about 4 to 9% of its volume of water. Also, its wet strength lies between 75 and 100% of its dry strength.

A board product having even greater dimensional stability can be prepared by employing a resin which is made in accordance with Example 2 hereinabove and is then copolymerized with formaldehyde and urea in the following manner:

The aqueous solution of amino lignosulfonate resin of Example 2 (by which is meant the amino lignosulfonate reacted with acetone and formaldehyde as described in Example 2), is refluxed with formaldehyde and a small amount of acetone. The formaldehyde is used in the form of a 35% aqueous solution and in amount equal to 15% of HCHO based on the dry weight of amino lignosulfonate resin. The acetone is used in the amount of 3–12% of the dry amino lignosulfonate resin. The acetone acts to solubilize the resin and prevent it from precipitating. pH is maintained at 3–5 by the addition of formic acid or ammonia, if necessary. Refluxing occurs at 95 to 99° C. and is continued for about 3 hours. Urea is then added in an amount equal to 20% of the combined weight of amino lignosulfonate resin, formaldehyde, acetone and urea. Then 5% more of the formaldehyde is added (calculated as HCHO and based on the total organic matter). The formaldehyde is added in the form of a 37% aqueous solution. Refluxing is continued for at least about five minutes. Excessive refluxing is to be avoided because it may cause an insoluble precipitate to form.

The product is an aqueous solution of a copolymer of amino lignosulfonate resin which formaldehyde and urea. It can be recovered from the aqueous solution by precipitation by addition of acetone in excess to the resin solution. The solid precipitate is a resin which is light brown in color, and is water soluble especially at a pH of over seven. The resin may be molded by pressure at a temperature of about 125° C. It may be precipitated by aluminum sulfate on fibers to strengthen paper or boards. However, it is unnecessary to separate the resin from solution. The solution may be used to impregnate a board by any of the methods described hereinabove, for example, by sucking the solution through a preformed pad; by precipitating the resin on the fibers in a pulp; or by adding the solution to a pulp and using a closed circuit system.

Instead of urea, other similar reagents may be employed such as dicyandiamide, melamine, thiourea or other similar compounds having amide or imide groups.

Boards prepared with the copolymer just described have greatly improved dimensional stability, that is, they have less linear expansion when humidity is increased from 50 to 97%. Improvements in this respect of 20% to 33% have been observed.

It will, therefore, be apparent that a novel and very useful board product has been provided, also a method of preparing the same. Such boards product combines advantages of lighter weight nonstructural board and high density structural board.

I claim:

1. An artificial board formed of felted vegetable fibers unbonded by pressure, having a specific gravity not exceeding that of the original woody material, having high resistance to water and weathering compared to insulation and pulp boards, having a modulus of rupture related to specific gravity by the linear equation $$M = 700 + 11000(d - 0.3)$$

wherein M is the modulus of rupture as determined by ASTM D1037–52T and $d$ is the specific gravity of the board; said board having, as the bonding agent, a thermosetting resin produced from dehydrated waste sulfite liquor by extraction of solubles with liquid anhydrous ammonia, and reaction of the undissolved residue in aqueous solution with formaldehyde and acetone.

2. An artificial board formed of wet felted vegetable fibers bonded by a thermoset lignosulfonate resin derived from waste sulphite liquor and in which a substantial amount of fixed nitrogen is incorporated; said resin being derived from waste sulphite liquor by treating the dehydrated liquor with liquid anhydrous ammonia to dissolve the soluble fractions and reacting the insoluble residue with formaldehyde and acetone to yield a thermosetting resin; said board having a specific gravity not substantially greater than the specific gravity of, but having a modulus of rupture substantially greater than the modulus of rupture of, a board similarly prepared by the wet felting of vegetable fibers without an added bonding agent and without application of pressure to consolidate the fibers.

3. A method of producing a low specific gravity, high mechanical strength, water- and weather-resistant artificial board which comprises providing a pulp of wood fibers, incorporating in the pulp an acid-soluble, thermosetting resin produced from dehydrated waste sulfite liquor by extraction of solubles with liquid anhydrous ammonia and reaction of the undissolved residue in aqueous solution with formaldehyde and acetone; carrying out a closed circuit operation with such pulp containing said resin, said operation comprising forming a wet pad from said pulp containing said resin by a felting operation and application of pressure to squeeze water from the pad, said wet pad having a water-to-fiber ratio calculated, when the water is evaporated, to deposit an amount of resin on the fibers sufficient for bonding the fibers together, and recycling substantially all water separated from the pad by drainage and pressure; said method further comprising the further steps of drying the wet pad by thermal evaporation and causing the resin to set and cure, said further steps being carried out without the application of a pressure so high as to increase the specific gravity of the board substantially beyond the specific gravity of a thermally dried pad.

References Cited in the file of this patent

UNITED STATES PATENTS

| | | |
|---|---|---|
| 478,229 | Frank | July 5, 1892 |
| 757,337 | Nettl | Apr. 12, 1904 |

(Other references on following page)

UNITED STATES PATENTS

| | | | |
|---|---|---|---|
| 1,160,362 | Baekeland | Nov. 16, 1915 |
| 1,899,526 | Phillips | Feb. 28, 1933 |
| 2,037,522 | Lundback | Apr. 14, 1936 |
| 2,159,411 | Wallace | May 23, 1939 |
| 2,184,622 | Mauthe et al. | Dec. 26, 1939 |
| 2,191,737 | Alles | Feb. 27, 1940 |
| 2,205,355 | Grimm | June 18, 1940 |
| 2,228,567 | John | Jan. 14, 1941 |
| 2,266,265 | Rieche | Dec. 16, 1941 |
| 2,286,643 | Phillips et al. | June 16, 1942 |
| 2,297,635 | Schorger | Sept. 29, 1942 |
| 2,338,602 | Schur | Jan. 4, 1944 |
| 2,365,599 | Schirm | Dec. 19, 1944 |
| 2,491,832 | Salvesen | Dec. 20, 1949 |
| 2,680,995 | Frost | June 15, 1954 |
| 2,744,013 | Dorland et al. | May 1, 1956 |
| 2,846,431 | Goss | Aug. 5, 1958 |
| 2,849,314 | Goss | Aug. 26, 1958 |
| 2,872,337 | Heritage et al. | Feb. 3, 1959 |